United States Patent
Srinivasan et al.

[11] Patent Number: 5,851,935
[45] Date of Patent: Dec. 22, 1998

[54] CROSS-DIRECTIONALLY STRETCHABLE ELASTOMERIC FABRIC LAMINATED BY THERMAL SPOT BONDING

[75] Inventors: Ramesh Srinivasan, Billerica; W. Andrew Coslett, Medfield; Angelo Colace, Walpole, all of Mass.

[73] Assignee: BBA Nonwovens Simpsonville, Inc., Simpsonville, S.C.

[21] Appl. No.: 705,208

[22] Filed: Aug. 29, 1996

[51] Int. Cl.⁶ .................................................. B32B 3/26
[52] U.S. Cl. ........................ 442/328; 442/381; 442/392; 442/399
[58] Field of Search .................. 442/328, 381, 442/392, 399

[56] References Cited

U.S. PATENT DOCUMENTS

| | | |
|---|---|---|
| 453,564 | 6/1891 | Peterson . |
| T875,026 | 6/1970 | Scharf . |
| 1,002,842 | 9/1911 | Harriss . |
| 1,707,400 | 4/1929 | Kerruish . |
| 2,566,439 | 9/1951 | Beachler ......................... 92/44 |
| 2,594,229 | 4/1952 | Snyder et al. ................. 154/124 |
| 2,705,686 | 4/1955 | Ness et al. ..................... 117/38 |
| 2,705,692 | 4/1955 | Petterson ...................... 154/101 |
| 2,998,341 | 8/1961 | Vaughan ........................ 154/124 |
| 3,003,903 | 10/1961 | Vaughan ....................... 154/50 |
| 3,325,331 | 6/1967 | Schwanekamp et al. ..... 156/290 |
| 3,485,705 | 12/1969 | Harmon ........................ 161/59 |
| 3,507,943 | 4/1970 | Such et al. .................... 264/103 |
| 3,542,634 | 11/1970 | Such et al. .................... 161/88 |
| 3,575,764 | 4/1971 | McFarren ..................... 156/309 |
| 3,678,933 | 7/1972 | Moore et al. ................. 128/296 |
| 3,695,967 | 10/1972 | Ross .............................. 156/209 |
| 3,832,256 | 8/1974 | Kalwaites ..................... 156/179 |
| 3,850,785 | 11/1974 | McQuade et al. ............ 161/88 |
| 3,913,510 | 10/1975 | Larsen .......................... 112/410 |
| 4,107,364 | 8/1978 | Sisson .......................... 428/198 |
| 4,414,970 | 11/1983 | Berry ............................ 128/156 |
| 4,446,189 | 5/1984 | Romanek ..................... 428/152 |
| 4,469,735 | 9/1984 | Trokhan ....................... 428/154 |
| 4,493,868 | 1/1985 | Meitner ........................ 428/171 |
| 4,508,113 | 4/1985 | Malaney ....................... 128/132 D |
| 4,517,714 | 5/1985 | Sneed et al. .................. 28/103 |
| 4,522,203 | 6/1985 | Mays ............................ 128/132 D |
| 4,555,811 | 12/1985 | Shimalla ...................... 2/51 |
| 4,573,991 | 3/1986 | Pieniak et al. ............... 604/385 |
| 4,595,629 | 6/1986 | Mays ............................ 428/286 |
| 4,606,964 | 8/1986 | Wideman ..................... 428/152 |
| 4,692,368 | 9/1987 | Taylor et al. ................. 428/137 |
| 4,695,334 | 9/1987 | Mays ............................ 156/62.2 |
| 4,722,857 | 2/1988 | Tomioka et al. ............. 428/113 |
| 4,725,473 | 2/1988 | Van Gompel et al. ....... 428/156 |
| 4,726,976 | 2/1988 | Karami et al. ............... 428/137 |
| 4,741,944 | 5/1988 | Jackson et al. .............. 428/152 |
| 4,756,786 | 7/1988 | Malaney ....................... 156/308 |
| 4,758,297 | 7/1988 | Calligarich .................. 156/251 |
| 4,780,352 | 10/1988 | Palumbo ..................... 428/138 |
| 4,781,962 | 11/1988 | Zamarippa et al. ......... 428/138 |
| 4,842,596 | 6/1989 | Kielpikowski et al. ..... 604/385.2 |
| 4,883,707 | 11/1989 | Newkirk ..................... 428/219 |
| 5,002,815 | 3/1991 | Yamanaka et al. ......... 428/109 |
| 5,030,302 | 7/1991 | Jud et al. .................... 156/164 |
| 5,178,706 | 1/1993 | Nishibara et al. .......... 156/229 |

(List continued on next page.)

FOREIGN PATENT DOCUMENTS

| | | |
|---|---|---|
| WO/93/15247 | 8/1993 | WIPO . |
| WO/93/15248 | 8/1993 | WIPO . |

*Primary Examiner*—Jenna Davis
*Attorney, Agent, or Firm*—Ostrager Chong Flaherty & Onofrio

[57] ABSTRACT

An elastomeric laminated fabric which is elastic in the cross direction. The laminate includes an elastomeric film having one or two nonwoven webs of carded thermoplastic staple fibers thermally point bonded thereto using heated calendar rolls. The resulting laminated fabric is stretchable by at least 100% in the cross direction without breaking for at least two cycles and recovers elastically. The fiber content of the nonwoven webs is at least 50% high-elongation polyolefin staple fibers having a breaking strain of at least 400%.

5 Claims, 9 Drawing Sheets

U.S. PATENT DOCUMENTS

| | | | |
|---|---|---|---|
| 5,185,052 | 2/1993 | Chappell et al. | 156/462 |
| 5,246,772 | 9/1993 | Manning | 428/284 |
| 5,281,209 | 1/1994 | Osborn, III et al. | 604/385.1 |
| 5,294,482 | 3/1994 | Gessner | 428/287 |
| 5,300,058 | 4/1994 | Goulait et al. | 604/391 |
| 5,330,461 | 7/1994 | Leeker | 604/385.2 |
| 5,334,446 | 8/1994 | Quantrille et al. | 428/284 |
| 5,344,416 | 9/1994 | Niihara | 604/385.1 |
| 5,354,400 | 10/1994 | Lavash et al. | 156/227 |
| 5,366,782 | 11/1994 | Curro et al. | 428/137 |
| 5,393,599 | 2/1995 | Quantrille et al. | 428/284 |
| 5,494,736 | 2/1996 | Willey et al. | 428/288 |

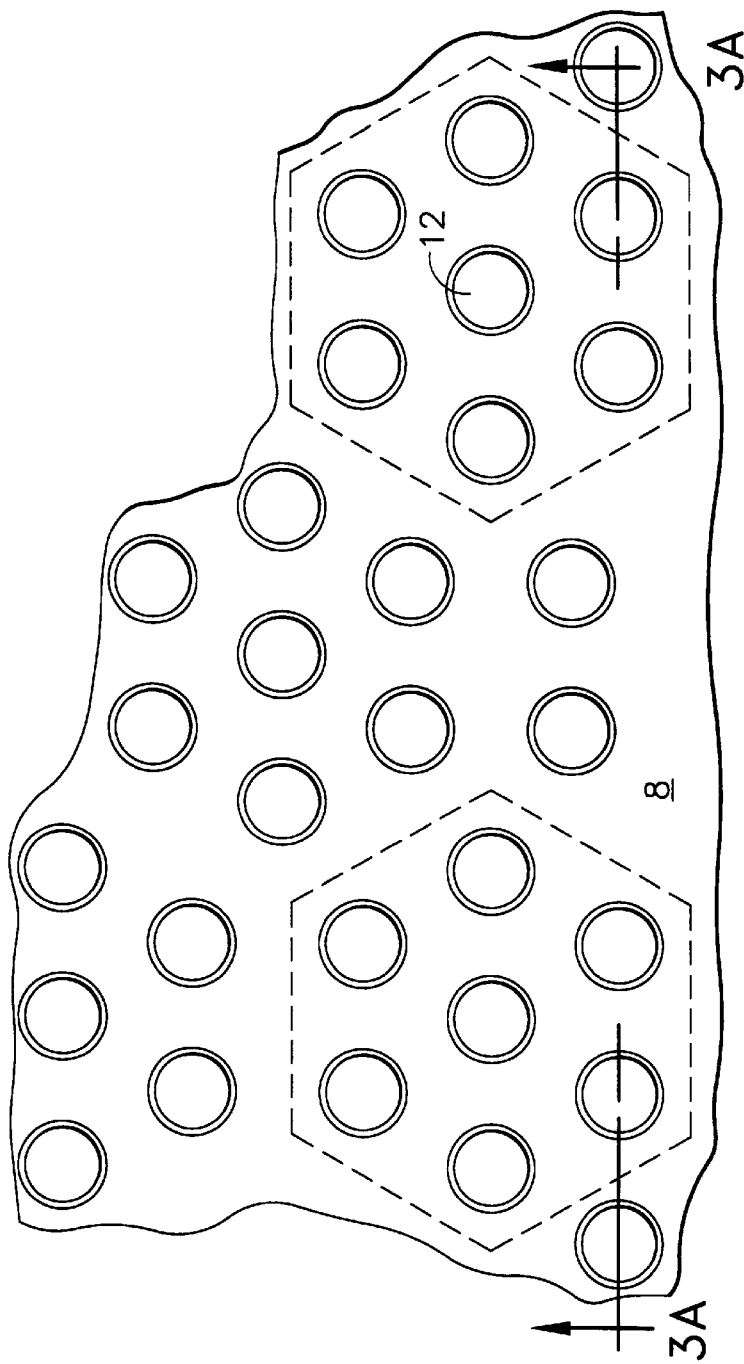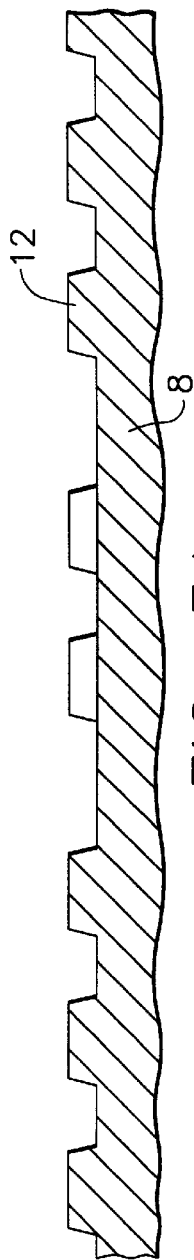
FIG. 3B
FIG. 3A

CROSS-DIRECTIONALLY STRETCHABLE ELASTOMERIC FABRIC LAMINATED BY THERMAL SPOT BONDING

FIELD OF THE INVENTION

This invention generally relates to elastomeric laminates comprising nonwoven fabric. In particular, the invention relates to elastomeric laminates in which nonwoven gatherable webs of thermoplastic fibers sandwich a layer of elastomeric material.

BACKGROUND OF THE INVENTION

Stretchable composites made of elastomeric material laminated to a nonwoven web are ideally suited for use in consumer disposable articles such as diapers, adult incontinence pads and sanitary napkins. Such composites conform to the shape of the human body and thus provide an excellent fit for the wearer. Elastomeric composites have been manufactured using a variety of techniques to achieve laminated fabric which is stretchable in the machine direction. As used herein, the machine direction of a fabric lies parallel with the fabric direction of travel on a continuous processing line, whereas the cross direction lies perpendicular to the machine direction in the plane of the fabric.

U.S. Pat. No. 3,695,967 to Ross teaches a method for manufacturing an air-permeable laminate in which nonwovens (e.g., carded webs) are laminated to a thermoplastic film by the application of pressure and heat at spaced-apart bonding sites where the film is melted to form apertures. In particular, Example 14 of Ross discloses that the film can be a 1-mil-thick film made of thermoplastic polyurethane, which is an elastomeric material. Ross further discloses that heat and pressure can be applied by means of an embossed or engraved pattern or by means of a screen inserted between the laminate and another pressure means. The pressure employed is high enough to cause the raised areas of the pressure surface to impress a pattern in the adjacent surface of the laminate, i.e., form compacted points on the surface.

U.S. Pat. No. 4,414,970 to Berry discloses a moisture vapor-transmitting elastic bandage comprising inner and outer layers of fabric bonded to a central layer. The central layer comprises an apertured elastomeric film. The specification states that the apertured elastomeric film may take the form of a perforated film or a net in which the strands and junctures are formed integrally during manufacture. In its preferred form, the net consists essentially of longitudinal and transverse strands to give a square grid hole pattern. The strata can be bonded by heat sealing or adhesive. The Berry patent also discloses the use of thermoplastic polyurethane.

Also of interest is U.S. Pat. No. 4,573,991 to Pieniak et al., which discloses a laminated structure comprising a reticulated elastic member disposed between two substrates of flexible gatherable material. The substrates are bonded together through the apertures in the reticulated elastic member using adhesive.

A bulked composite web comprising a differentially tensioned reticulated web of elastic material bonded to at least one gatherable web is disclosed in U.S. Pat. No. 4,606,964 to Wideman. The reticulated web is formed by bonding individual strands at crossover points. The individual strands are differentially tensioned prior to bonding. Wideman states that the reticulated web can be joined to the gatherable web by ultrasonic bonding.

U.S. Pat. No. 4,842,5996 to Kielpikowski discloses an elastomeric trilaminate which can be used as the outer cover or as leg and waist gathers in a disposable absorbent garment. The trilaminate comprises a liquid impervious elastomeric film carrier sheet sandwiched and bonded at spaced apart sites between a pair of nonwoven facing sheets. Kielpikowski discloses that the sheets can be laminated by ultrasonic or thermal bonding. Breathable apertures are formed which laminate the carrier and facing sheets together.

Converted articles, such as diapers, employ stretch features in the waist or side regions. Manufacturers of such articles prefer that the stretchable rolled good stretch preferentially in the cross direction rather than the machine direction. Efforts by rolled good suppliers have heretofore failed to produce inexpensive nonwoven stretch composites that stretch in the cross direction.

U.S. Pat. No. 5,334,446 to Quantrille et al. discloses a composite elastic nonwoven fabric which has anisotropic stretch properties, e.g., has elasticity in the cross direction only. The composite web is manufactured by forming a layered structure including a binder fiber-containing fibrous web and an elastomeric net; hydroentangling the layered structure and then thermally treating the hydroentangled fabric, e.g., by passing the fabric through heated smooth calendaring rolls. The need for hydroentangling increases the cost of this process and the final product.

SUMMARY OF THE INVENTION

The present invention is a composite web which is elastic in the cross direction. As used herein, the term "elastic" is used to refer to any structure that can stretch and recover a minimum of 50% of its original length of stretching in the cross direction. The composite web comprises nonwoven webs of carded thermoplastic staple fibers which are thermally bonded to opposing sides of an elastomeric film. This invention overcomes the aforementioned shortcomings of the prior art by engineering the nonwoven component to yield in the cross direction at comparably lower stress (lower modulus) than other nonwoven materials known in the art. Utilization of these nonwovens, in conjunction with commonly available elastomeric films, produces an elastomeric laminate with superior stretch/recovery in the cross direction and soft texture, upon lamination by a thermal bonding process using heated calendar rolls.

The composite web in accordance with the invention comprises an elastomeric film, which is extensible and recoverable in the machine and cross directions, and carded webs of thermoplastic fibers bonded to opposing sides of the elastomeric film. The resulting laminated fabric is extensible and recoverable in the cross direction only. More specifically, the final laminate is stretchable by at least 100% in the cross direction without breaking and recovers elastically, as defined hereinabove.

The process of the invention can be used to produce cross directionally stretchable laminated fabric having basis weights ranging from 30 to 200 gsy. One outer nonwoven layer may be combined with the elastomeric film layer to form a bilaminate product, or two outer nonwoven layers may be combined with an intermediate elastomeric film to form a trilaminate product.

In accordance with the preferred embodiments of the invention, the outer layers of the trilaminate are nonwoven webs having a fiber content of 100% high-elongation polypropylene staple fibers having a relatively high breaking strain. As used herein, the term "high-elongation fiber" means fibers having a breaking strain of at least 400%. Other high-elongation staple thermoplastic fiber having similar elongation and breaking strain properties can be used in accordance with the broad concept of the invention. For example, high-elongation polyethylene staple fibers could be used instead of high-elongation polypropylene staple fibers provided that such polyethylene staple fibers have similar elongation and breaking strain properties. Alternatively, high-elongation bicomponent fibers made of polypropylene and polyethylene could be used.

In accordance with a second preferred embodiment, the high-elongation polypropylene staple fibers are blended with other staple fibers, e.g., high-elongation polyethylene staple fibers. Preferably, the percentage of high-elongation polypropylene fibers is at least 50% by weight.

The process for making the above-described nonwoven-elastomeric-nonwoven stretch trilaminate uses heated calendar rolls to thermally bond the carded webs of thermoplastic fibers to the elastomeric film in a one-step process. The calendar rolls comprise one engraved top roll and a smooth bottom roll. The engraving pattern on the top calendar roll has a 7-dot pattern wherein each repeating unit of the bond pattern comprises circular bond spots arranged with their centers at the vertices of a regular hexagon.

In the process for manufacturing a cross-directionally stretchable trilaminate, two carded webs of thermoplastic fibers are laminated to opposing sides of the unstretched elastomeric film. The carded webs and elastomeric film are laid on a conveyor belt and fed into the nip of a pair of opposed heated calendar rolls. The calendar rolls are heated to a temperature which must exceed the melting temperature of the thermoplastic fibers, which in turn exceeds the melting temperature of the elastomeric film. After cooling, the melted thermoplastic fibers fuse to each other across the aperture formed in the film by the melted elastomer, leaving a web of densified and fused fibers extending across the film aperture. For polypropylene staple fibers, the preferred calendar roll temperature was in the range of 290°–310° F.

BRIEF DESCRIPTION OF THE DRAWINGS

FIG. 3A is a schematic showing a sectional view of a portion of the bond roll used for thermal bonding of the carded webs of thermoplastic fibers to the elastomeric film in accordance with the invention.

FIG. 3B is a schematic showing the arrangement of circular bond dots in a hexagonal pattern on the outer circumferential surface of the bond roll of FIG. 3A.

FIG. 4—100% T-104 fibers (63 gsy) and 2.4-mil-thick proprietary styrenic block copolymer stretch film (45 gsy) (Sample 1); FIG. 5—100% T-104 fibers (50 gsy) and 1.6-mil-thick proprietary styrenic block copolymer stretch film (33 gsy) (Sample 2); FIG. 6—100% T-104 fibers (33 gsy) and 1.6-mil-thick proprietary styrenic block copolymer stretch film (33 gsy) (Sample 3); FIG. 7—100% T-104 fibers (33 gsy) and 2.4-mil-thick proprietary styrenic block copolymer stretch film (45 gsy) (Sample 4); FIG. 8—100% T-104 fibers (15 gsy) and 2.4-mil-thick proprietary styrenic block copolymer stretch film (45 gsy) (Sample 5); FIG. 9—100% T-104 fibers (15 gsy) and 1.6-mil-thick proprietary styrenic block copolymer stretch film (33 gsy) (Sample 6); FIG. 10—100% T-104 fibers (50 gsy) and 1.8-mil-thick Exx 560 film (31 gsy) (Sample 7); FIG. 11—100% T-104 fibers (33 gsy) and 1.8-mil-thick Exx 560 film (31 gsy) (Sample 8); FIG. 12—100% T-104 fibers (15 gsy) and 1.8-mil-thick Exx 560 film (31 gsy) (Sample 9); FIG. 13—100% T-104 fibers (33 gsy) and 1.8-mil-thick Exx 553 film (35 gsy) (Sample 10); FIG. 14—50% T-104 and 50% T-413 fibers (27 gsy) and 1.6-mil-thick proprietary styrenic block copolymer stretch film (33 gsy) (Sample 11); FIG. 15—50% T-104 and 50% T-413 fibers (27 gsy) and 2.4-mil-thick proprietary styrenic block copolymer stretch film (45 gsy) (Sample 12); FIG. 16—50% T-104 and 50% T-413 fibers (27 gsy) and 1.8-mil-thick Exx 560 film (31 gsy) (Sample 13). The T-104 fibers are high-elongation polypropylene staple fibers (2.6 dpf×38 mm) and the T-413 fibers are high-elongation polyethylene staple fibers (3.0 dpf×48 mm). The proprietary styrenic block copolymer stretch, Exx 553 and Exx 560 films are made of elastomeric materials having different compositions.

FIGS. 17 and 18 are graphs of stress versus strain in the cross direction for two-cycle loading of thermally spot bonded film-based trilaminates made in accordance with the present invention from the following materials: FIG. 17—50% T-104 and 50% T-413 fibers (57 gsy) and 2.4-mil-thick Exx 560 film (55 gsy) (Sample 14); FIG. 18—50% T-104 and 50% T-413 fibers (32 gsy) and 2.4-mil-thick Exx 560 film (55 gsy) (Sample 15).

FIGS. 19 and 20 are graphs of stress versus strain in the cross direction for two-cycle loading of thermally spot bonded film-based trilaminates made in accordance with the present invention from the following materials: FIG. 19—100% T-104 fibers (20 gsy) and 2.4-mil-thick Exx 560 film White (49 gsy) (Sample 16); FIG. 20—100% T-104 fibers (50 gsy) and 2.4-mil-thick Exx 560 film White (49 gsy) (Sample 17).

DETAILED DESCRIPTION OF THE PREFERRED EMBODIMENTS

Figure 1:
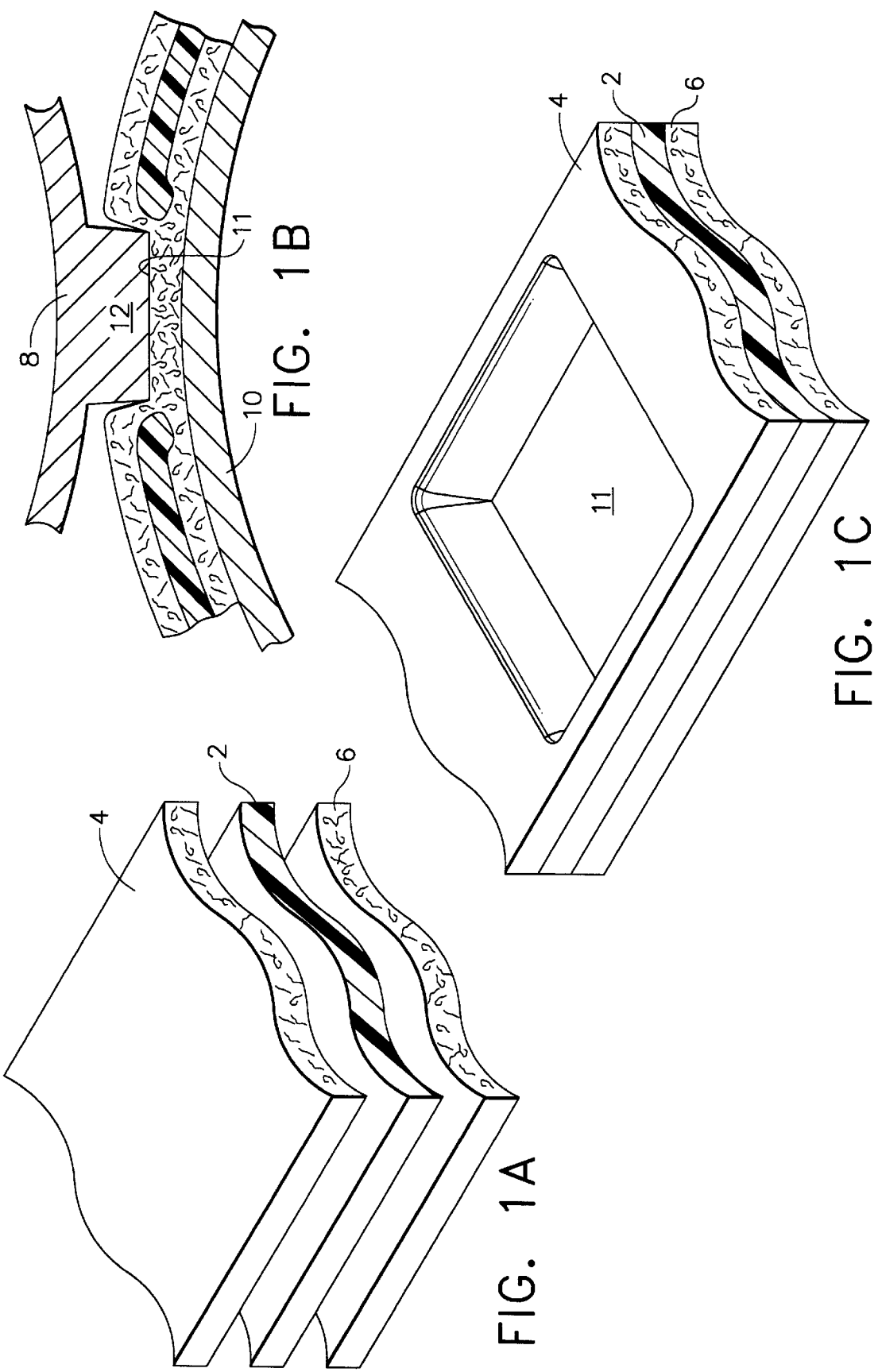
FIG. 1A is a schematic showing an exploded isometric view of the layers of material which make up the cross-directionally stretchable trilaminate fabric in accordance with the invention.
FIG. 1B is a schematic showing a magnified sectional view of a single bonding spot being formed in the unbonded structure of FIG. 1A by the heated calendar rolls in accordance with the present invention.
FIG. 1C is a schematic showing an isometric view of a portion of the cross-directionally stretchable trilaminate fabric in accordance with the invention after it has been thermally bonded as depicted in FIG. 1B.

The present invention is a nonwoven-elastomeric film-nonwoven (A-B-A) laminate which is ideally suited for use in the waist band or leg cuff of disposable diapers, training pants and other similar products. The nonwoven webs are made from staple thermoplastic fibers which have been carded and thermal spot bonded. As seen in FIG. 1A, the elastomeric film 2 is laid between an upper nonwoven web 4 and a lower nonwoven web 6. The three webs are then laminated together by thermal spot bonding using a pair of opposed heated calendar rolls. As shown in FIG. 1B, the upper calendar roll 8 is engraved and the lower calendar roll 10 is flat. During rotation of the calendar rolls, each land 12 on the circumference of upper calendar roll 8 compresses the fibers at the point of contact with the trilaminate. The heat and pressure at the bonding spot causes the thermoplastic material of the fibers and the elastomeric material of the film to melt, forming an aperture in the film, but not in the thermoplastic material. When the molten thermoplastic fibers cool, they fuse to form a thin compressed web 11 which extends across the film aperture.

In accordance with a preferred embodiment, each carded web has a fiber composition of 100% 2.6-dpf×38-mm hydrophobic polypropylene staple fibers having a break elongation of 420% and a tenacity of 1.93 gpd. These fibers are commercially available from Hercules Incorporated, Norcross, Ga., U.S.A. under the trade designation T-104. Alternatively, the nonwoven webs may comprise 100% high-break-elongation polyethylene staple fibers. Small quantities of cellulosic (e.g., rayon or cotton) or other thermoplastic (e.g., polyester or nylon) fibers can be blended with the polypropylene or polyethylene fibers in amounts which do not adversely affect the cross-directional extensible properties of the thermally bonded trilaminate.

The elastomeric films used in the invention may be made from thermoplastic elastomeric polymers, e.g., poly(styrene)/poly(ethylene-butylene)/poly(styrene) block copolymers. Such films are manufactured by Exxon Chemical under the trade designations Exx 553, 556, 560 and 561 in thicknesses of 1.8, 2.0, 2.4, 3.0 and 3.4 mils. These elastomeric films can be differentiated based on the amount of elasticity they possess, as indicated by measurement of the permanent set after extending the film to a certain percentage and by the amount of force or modulus needed to extend the film to a certain length. The Exx 553 and 556 films have a first elasticity; the Exx 560 and 561 films have a second elasticity greater than the first elasticity. Exxon Chemical also makes a proprietary styrenic block copolymer stretch film having an elasticity less than the aforementioned second elasticity but greater than the aforementioned first elasticity. The permanent set of Exx 560 film after the first pull to 200% is approximately 8–12%; that for the proprietary styrenic block copolymer stretch film is approximately 15–20%; and that for Exx 553 film is approximately 20–30%. The force required to extend the film is highest for Exx 553 film, followed by the proprietary styrenic block copolymer stretch film, followed by Exx 560 film. For example, the force to extend the Exx 553 film 100% in the machine direction in the second cycle is 377 gm compared to 245 gm for Exx 560 film. In accordance with the present invention, the elastomeric film gauge can be varied from 0.5 to 5.0 mils.

The basis weight range for the final trilaminate can be in the weight range of 30–200 gsy. The preferred product weighed 75 gsy, with 30 gsy of fiber and 45 gsy of film. However, the amount of fiber can be varied from 10 to 100 gsy.

Figure 2:
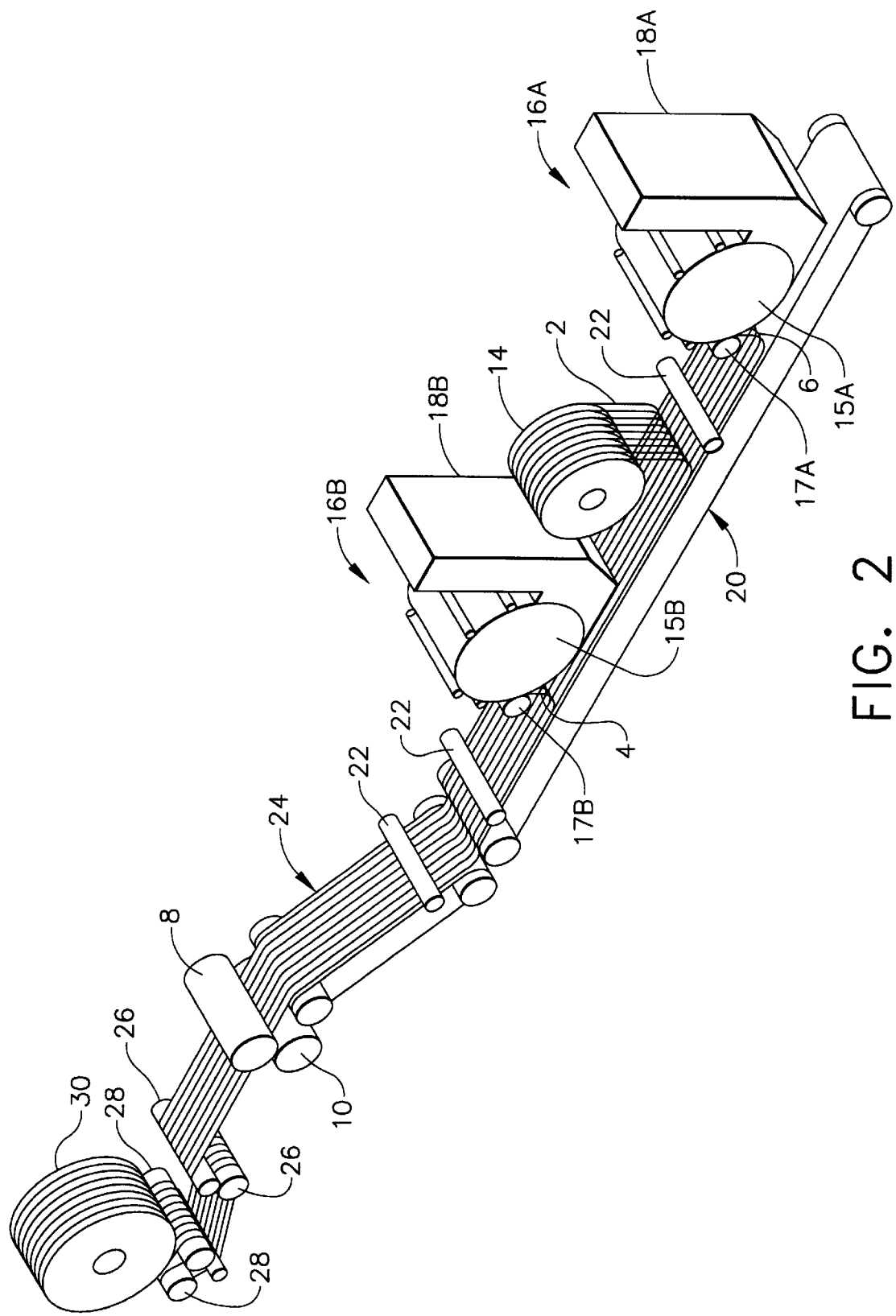
FIG. 2 is a schematic showing the processing line used for thermal bonding of a cross directionally stretchable trilaminate fabric in accordance with the invention.

Defining the nonwoven as component "A" and the elastomer as "B", the materials are combined in an ABA configuration by use of thermal spot bonding. As seen in FIG. 2, the elastomeric film 2 is unwound from a supply roll 14. At the same time, carded webs 4 and 6, are respectively formed by conventional carding devices 16A and 16B. Each carding device is associated with a respective hopper 18A, 18B with a chute feed for feeding a dense mat of fibers to the inlet of the carding device. Each carding device consists of an assembly of rotating cylinders and rollers covered with a sawtooth-type metallic wire. There are two main actions that take place in each carding device: carding and stripping. The "carding" action that occurs between the rollers is the combing of fibers between two metallic clothed surfaces that have opposing points. It is a mechanical action in which fibers are held by one surface while another surface combs them, rendering the fibers parallel to one another. The "stripping" action occurs when the fibers are transferred from one roll to another with metallic wire points in the same direction. A speed differential between the two rollers allows fiber transfer. As shown schematically in FIG. 2, a series of smaller rollers are spaced along the top of the main cylinders 15A, 15B. For the sake of simplicity, FIG. 2 shows a single roller at each station. However, it is understood by persons skilled in the art that each station in fact comprises a worker roller and a stripper roller working in tandem. The fiber tufts are worked on by the worker roller and then transferred to the stripper roller. The stripper puts the fibers back onto the main cylinder ahead of the carding plane, which allows the fibers to be worked on repetitively until the fiber tufts are reduced to single fibers. This process continues throughout the top of the main cylinder, which accounts for the web being 20–50 times less dense than the feed mat.

The fibers then travel to the doffers 17A, 17B, which are moving slower than the main cylinder and in the same direction. Further carding occurs at this junction. After making half a turn on the doffer, the fibers come up under a comb (not shown). The function of the comb is to remove the fibers from the doffer with as little disturbance as possible. The action of the comb is strictly stripping and the web of fibers is gently deposited onto a moving card conveyor 20.

The main purposes of the carding devices are: (1) to open the fiber flock; (2) if necessary, to clean the fibers of extraneous matter like dirt and shorter fibers; (3) to make the fibers straight and orient the single fibers parallel to each other; and (4) to convert the single fibers into a continuous uniform web in which fibers are held together by their own adhesion.

As seen in FIG. 2, the carding device 16A forms a carded web 4; the carding device 16B forms a carded web 6. First, the carded web 4 is laid on top of the moving card conveyor 20; then the elastomeric film 2 is laid on top of the carded web 4; and lastly, the carded web 6 is laid on top of the elastomeric film 2. The sandwich comprising elastomeric film 2 between carded webs 4, 6 of thermoplastic fibers is fed into the nip between heated calendar rolls 8 and 10 via card conveyor 20, a plurality of idler rolls 22 and an inclined conveyor 24.

In accordance with the preferred method of manufacture, the top calendar roll 8 is engraved and the bottom calendar roll 10 is smooth. Depending on the materials used, the temperature of the top and bottom rolls may be in the range of 200°–450° F. For polypropylene staple fibers, the calendar roll temperature should be in the range of 290–310° F., preferably about 299° F. The pressure between the top and bottom rolls may be in the range of 100–600 pli. However, it is preferred that the pressure between the top and bottom calendar rolls be about 250 pli. The line speed may be in the range of 50–600 fpm. Samples were manufactured at a line speed of 100 fpm.

The laminate bond pattern on the engraved top roll 8 can have any one of a number of different geometries. The total bonding area can be varied in the range of 5–30%. The top engraved calendar roll used to form the elastomeric laminate of the invention is specifically designed to yield the desired stress/strain properties, namely, that the laminated fabric be stretched by at least 100% in a cross direction and then released to recover elastically during each of at least two cycles of expansion and contraction. In accordance with the preferred embodiment, the engraved top calendar roll 8 has a repeating 7-point dot pattern of spaced circular lands 12 which form the bond spots.

The geometry of the lands is shown in FIG. 3A. As seen in FIG. 3B, each repeating unit of the bonding pattern is arranged in a hexagonal fashion. The hexagonal unit is repeated at a distance of 0.261 inch in the machine direction and a distance of 0.463 inch in the cross direction. Each hexagonal unit consists of a circular bond spot of 0.048-inch diameter at the center surrounded by an outer array of six circular spots of the same diameter at the vertices of a hexagon. The center-to-center distance of the outer array of circular spots is 0.094 inch. The outer circular spots are also radially spaced at a distance of 0.094 inch from the central circular spot. The aforementioned 7-point dot bond pattern has a total of 115 bond spots per square inch, resulting in a total bond area of 19.1%.

Referring again to FIG. 2, after being laminated by the calendar rolls 8 and 10, the trilaminate fabric passes through a pair of opposing rolls 26 which control in-wound stretch of the trilaminate. The trilaminate is optionally spread by a spreader roll to remove wrinkles. Then the trilaminate is wound by a pair of surface winder rolls 28, both of which are driven. The surface winder has slitting capability. The final product is a wound roll 30 of soft trilaminate fabric which is stretchable by at least 100% in the cross direction without breaking and which recovers elastically.

During trial runs, samples were manufactured in accordance with the above-described parameters and then subjected to various tests, including cyclical stress-strain tests. The cyclical stress-strain tests were performed by stretching 1-inch×7-inch strips of the trilaminate in the cross direction to 200% of its original (unstretched) length in the cross direction in an Instron tensile tester. Each sample was held for 30 sec at this stretched condition and then allowed to relax. A chart was obtained from the Instron tensile tester that traces this cycle. The force in grams was then read off the chart at suitable intervals of elongation for both the expansion and contraction cycles and then plotted as shown in FIGS. 4–20.

Figure 4:
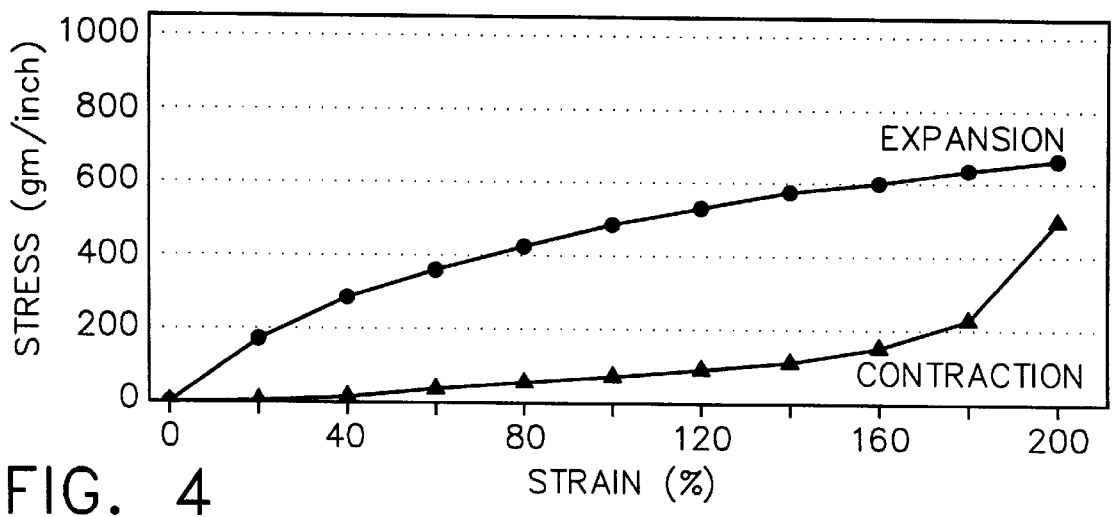
FIGS. 4–16 are graphs of stress versus strain in the cross direction for one-cycle loading of thermally spot bonded film-based trilaminates made in accordance with the present invention from the following materials.

FIG. 4 is a graph of stress versus strain in the cross direction for one-cycle loading (●, expansion; ▲, contraction) of Sample 1 of a trilaminate comprising respective carded webs of high-elongation thermoplastic fibers thermally spot bonded to an elastomeric film in accordance with the present invention. The fiber content of the carded webs for Sample 1 was 100% high-elongation polypropylene staple fibers (2.6 dpf×38 mm), commercially available from Hercules Incorporated under the trade designation T-104. The film was the proprietary styrenic block copolymer stretch film (2.4 mils thick, clear). The fiber/film weight distribution was 63 gsy fiber, 45 gsy film. As is apparent from FIG. 4, a force in excess of 600 gm/inch was needed to stretch this sample 200%.

Figure 5:
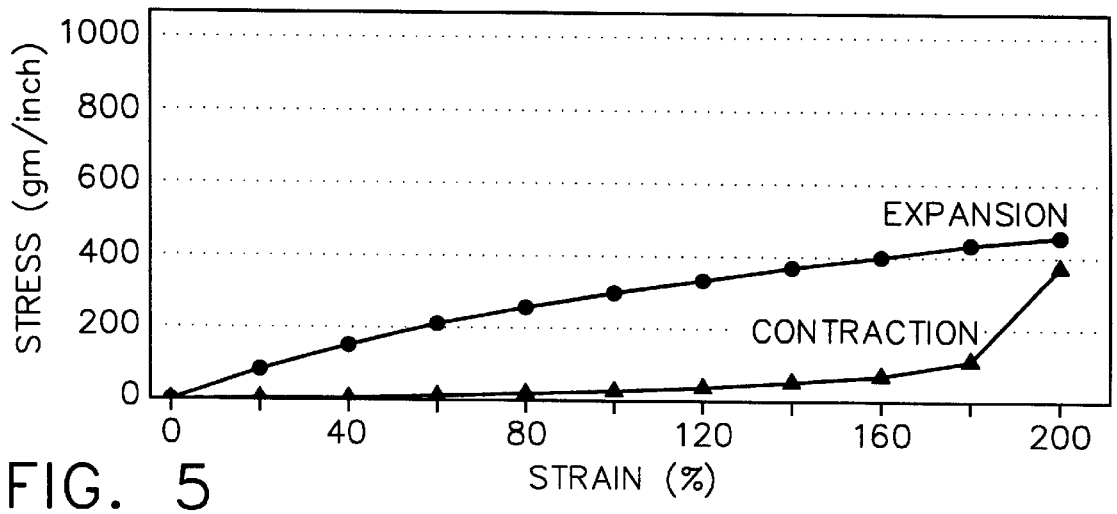

FIG. 5 shows the stress versus strain for one-cycle loading of a trilaminate (Sample 2) made using the same materials used to make the Sample 1, except that the fiber weight was decreased to 50 gsy and the thickness of the proprietary styrenic block copolymer stretch film was 1.6 mils (33 gsy) instead of 2.4 mils. A force of about 460 gm/inch was needed to stretch Sample 2 200%.

Figure 6:
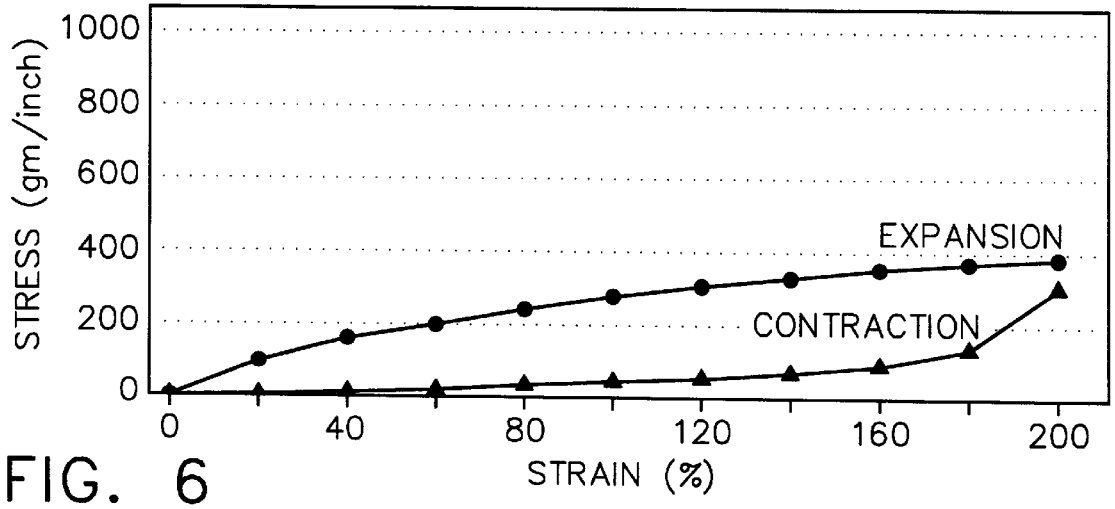

FIG. 6 shows the stress versus strain for one-cycle loading of a trilaminate (Sample 3) made using the same materials used to make the Sample 2, except that the fiber weight was further decreased to 33 gsy. A force of about 400 gm/inch was needed to stretch Sample 3 200%.

Figure 7:
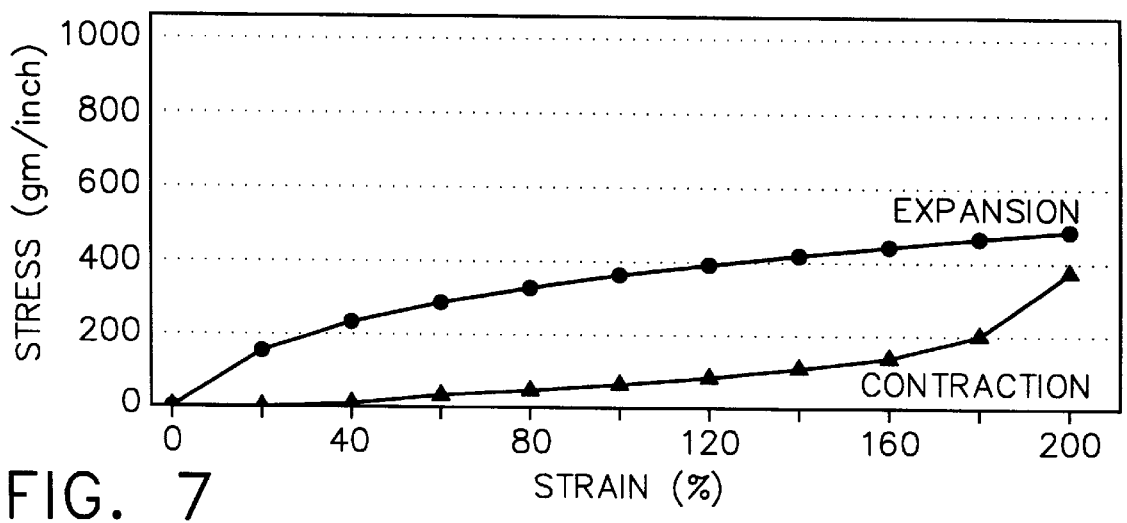

FIG. 7 shows the stress versus strain for one-cycle loading of a trilaminate (Sample 4) made using the same materials used to make the Sample 1, except that the fiber weight was decreased to 33 gsy. A force of about 490 gm/inch was needed to stretch Sample 4 200%.

Figure 8:
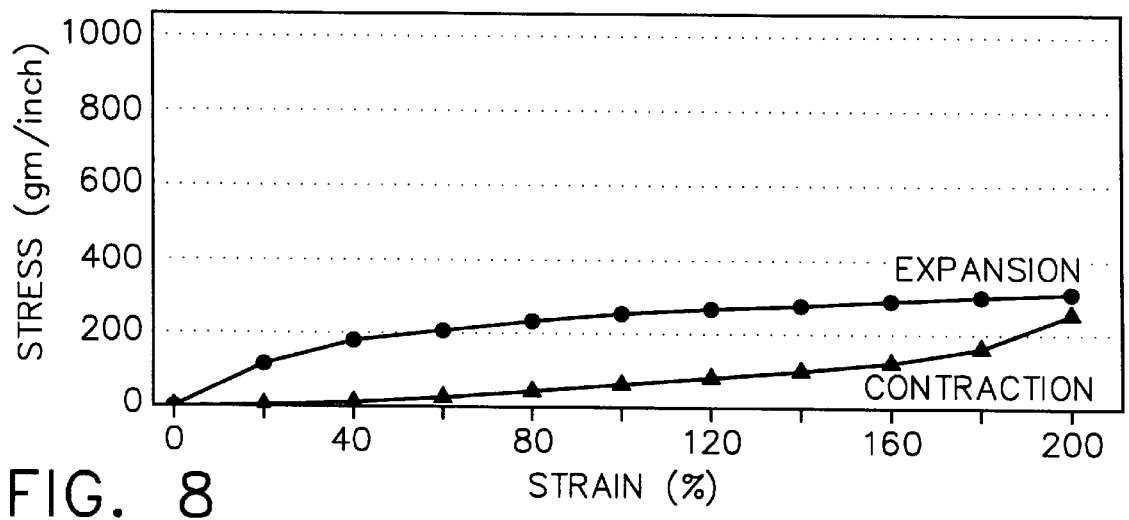

FIG. 8 shows the stress versus strain for one-cycle loading of a trilaminate (Sample 5) made using the same materials used to make the Sample 1, except that the fiber weight was further decreased to 15 gsy. A force of about 300 gm/inch was needed to stretch Sample 5 200%.

Figure 9:
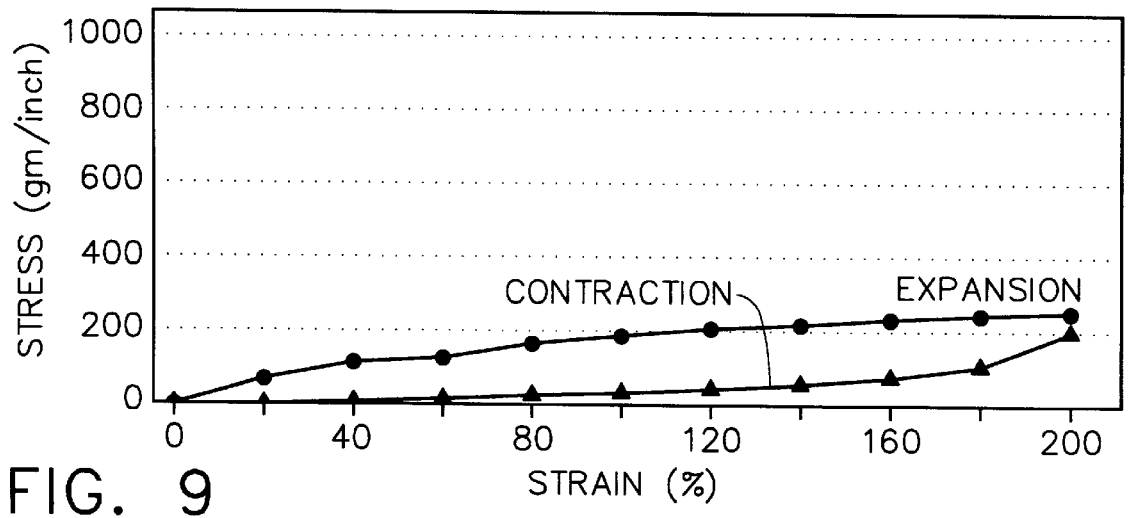

FIG. 9 shows the stress versus strain for one-cycle loading of a trilaminate (Sample 6) made using the same materials used to make the Sample 2, except that the fiber weight was decreased to 15 gsy. A force of about 250 gm/inch was needed to stretch Sample 6 200%.

Other properties of Samples 1–6 are listed in Table 1:

TABLE 1

| Properties | Sample No. | | | | | |
| --- | --- | --- | --- | --- | --- | --- |
|  | 1 | 2 | 3 | 4 | 5 | 6 |
| Weight, gsy | 102.1 | 77.4 | 67.5 | 81.8 | 64.0 | 46.8 |
| Caliper, mils | 33.8 | 29.5 | 25.2 | 26.3 | 14.9 | 14.3 |
| MD Tensile, gm/in. | 3215.0 | 4516.0 | 2520.0 | 2628.0 | 1241.0 | 1705.0 |
| MD Elongation @ break, % | 68.2 | 87.1 | 78.0 | 66.5 | 56.4 | 65.7 |
| CD Tensile, gm/in. | 608.5 | 345.3 | 452.3 | 552.6 | 398.1 | 216.3 |
| CD Elongation @ break, % | 314.0 | 247.6 | 298.8 | 347.3 | 431.9 | 336.8 |
| Frazier Air Permeability, cfm | 8.0 | 42.5 | 9.3 | 5.2 | 21.6 | 39.8 |

Figure 10:
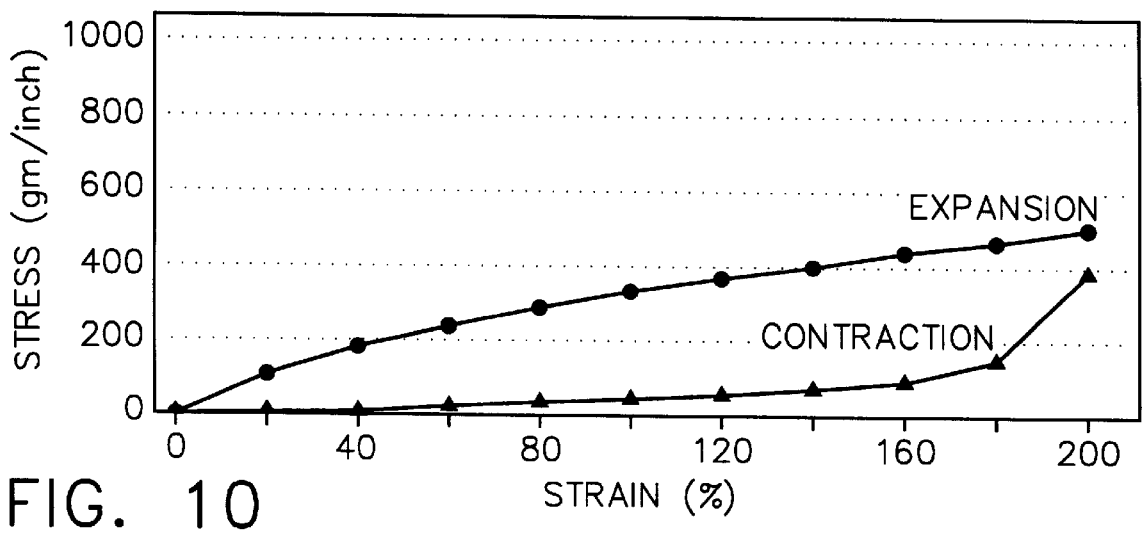

FIG. 10 is a graph of stress versus strain in the cross direction for one-cycle loading (●, expansion; ▲, contraction) of Sample 7 of a trilaminate comprising respective carded webs of high-elongation thermoplastic fibers thermally spot bonded to an elastomeric film in accordance with the present invention. The fiber content of the carded webs for Sample 7 was 100% T-104 fibers. The film was Exx 560 (1.8 mils thick, clear). The fiber/film weight distribution was 50 gsy fiber, 31 gsy film. As is apparent from FIG. 10, a force in excess of 500 gm/inch was needed to stretch this sample 200%.

Figure 11:
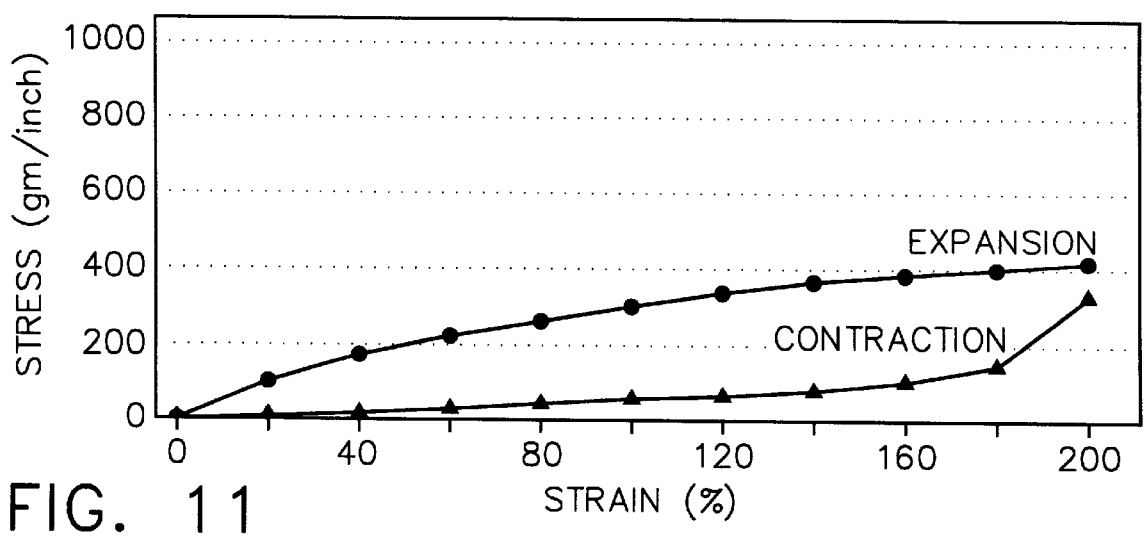

FIG. 11 shows the stress versus strain for one-cycle loading of a trilaminate (Sample 8) made using the same materials used to make the Sample 7, except that the fiber weight was decreased to 33 gsy. A force of about 400 gm/inch was needed to stretch Sample 8 200%.

Figure 12:
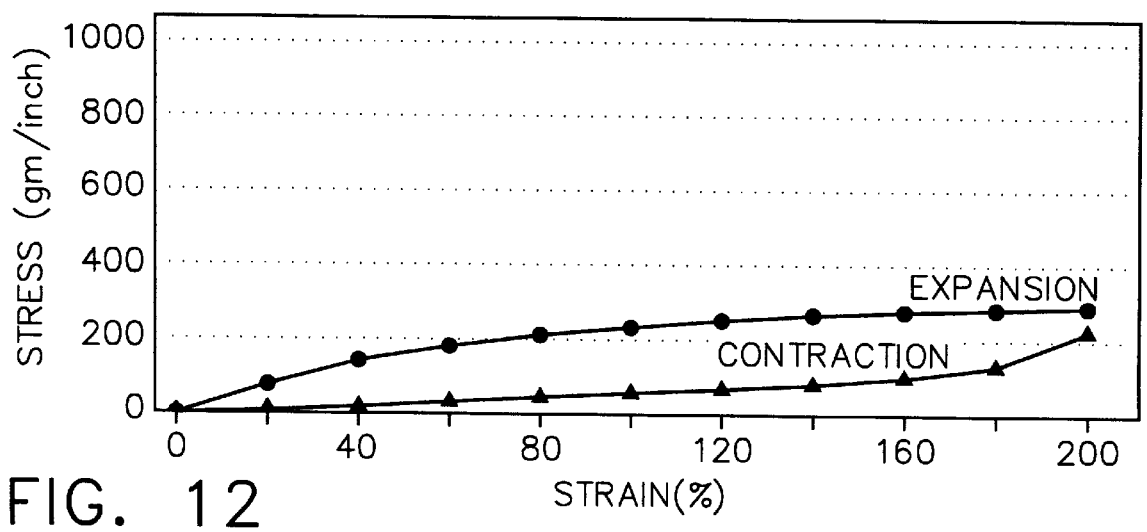

FIG. 12 shows the stress versus strain for one-cycle loading of a trilaminate (Sample 9) made using the same materials used to make the Sample 7, except that the fiber weight was further decreased to 15 gsy. A force of about 300 gm/inch was needed to stretch Sample 9 200%.

Figure 13:
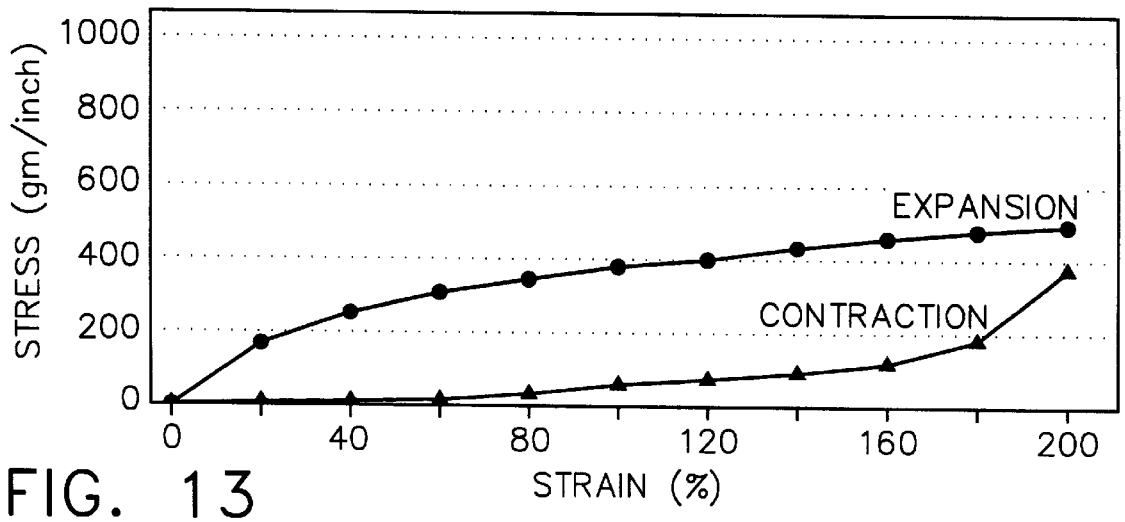

FIG. 13 is a graph of stress versus strain in the cross direction for one-cycle loading (●, expansion; ▲, contraction) of Sample 10 of a trilaminate comprising respective carded webs of high-elongation thermoplastic fibers thermally spot bonded to an elastomeric film in accordance with the present invention. The fiber content of the carded webs for Sample 10 was 100% T-104 fibers. The film was Exx 553 (1.8 mils thick, clear). The fiber/film weight distribution was 33 gsy fiber, 35 gsy film. As is apparent from FIG. 13, a force of 500 gm/inch was needed to stretch this sample 200%.

Figure 14:
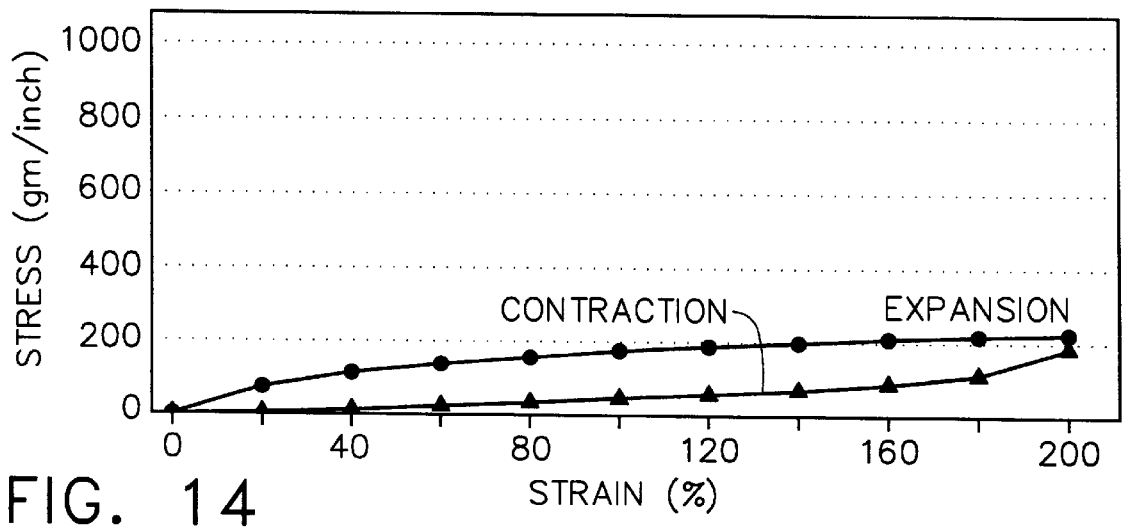

FIG. 14 shows the stress versus strain for one-cycle loading of a trilaminate (Sample 11) made using a blend of thermoplastic fibers: 50% high-elongation polypropylene staple fibers (2.6 dpf×38 mm) (namely, T-104 fibers from Hercules Inc.) and 50% polyethylene staple fibers (3.0 dpf×48 mm), commercially available from Hercules Inc. under the trade designation T-413. It was determined by measurement that the T-413 fibers have a break elongation of 413% and a tenacity of 1.35 gpd. The film was the same as that used in Sample 2 (proprietary styrenic block copolymer stretch, 1.6 mils). The fiber/film weight distribution was 27 gsy fiber, 33 gsy film. A force of about 220 gm/inch was needed to stretch this sample 200%.

Figure 15:
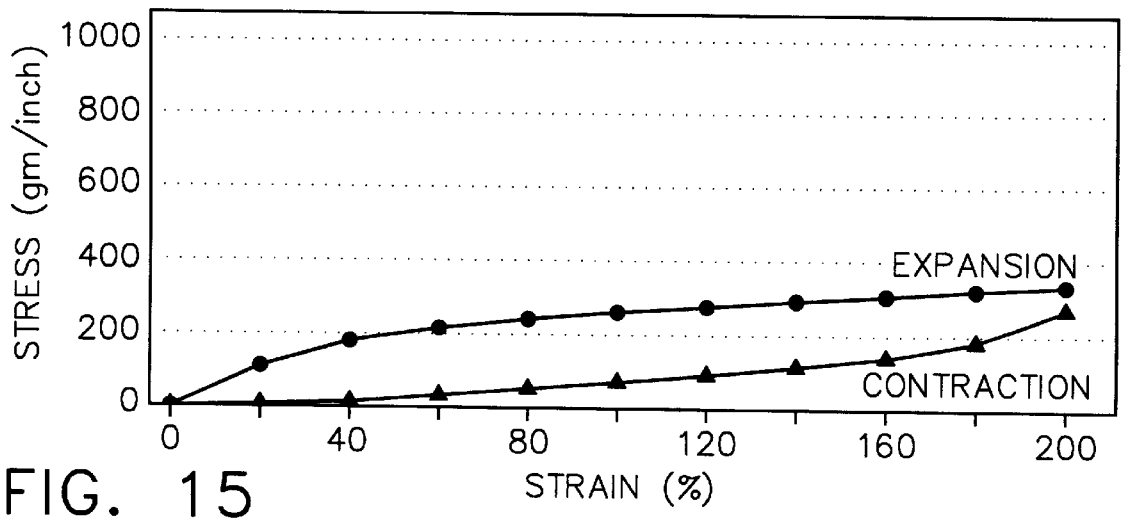

FIG. 15 shows the stress versus strain for one-cycle loading of a trilaminate (Sample 12) made using the same materials used to make Sample 11, except that the thickness of the proprietary styrenic block copolymer stretch film was 2.4 mils (45 gsy) instead of 1.6 mils. A force of about 340 gm/inch was needed to stretch Sample 12 200%.

Figure 16:
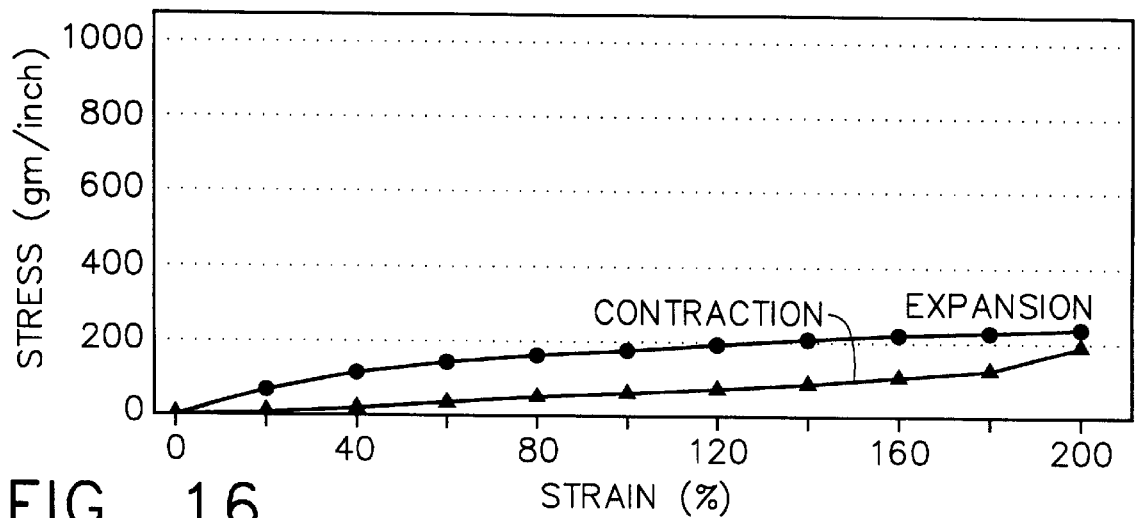
Figure 19:
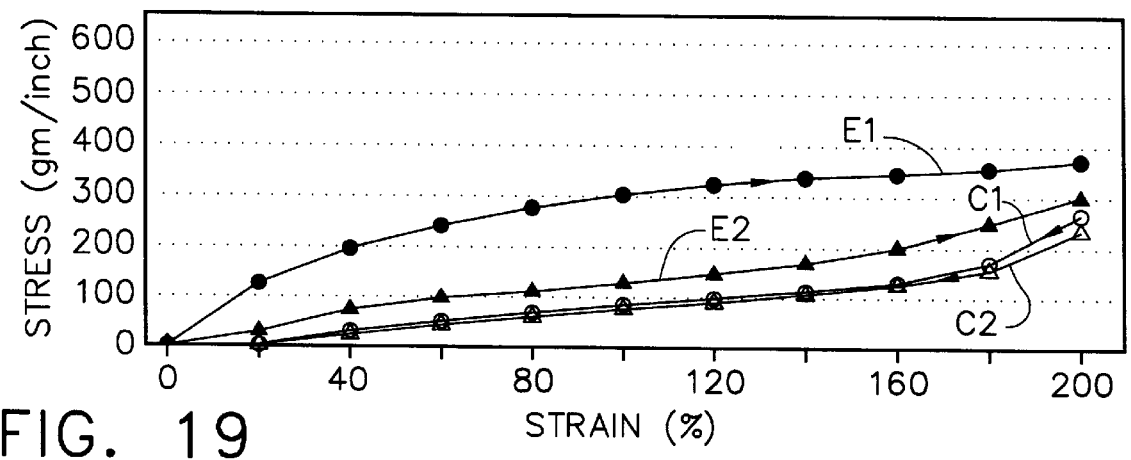
Figure 20:
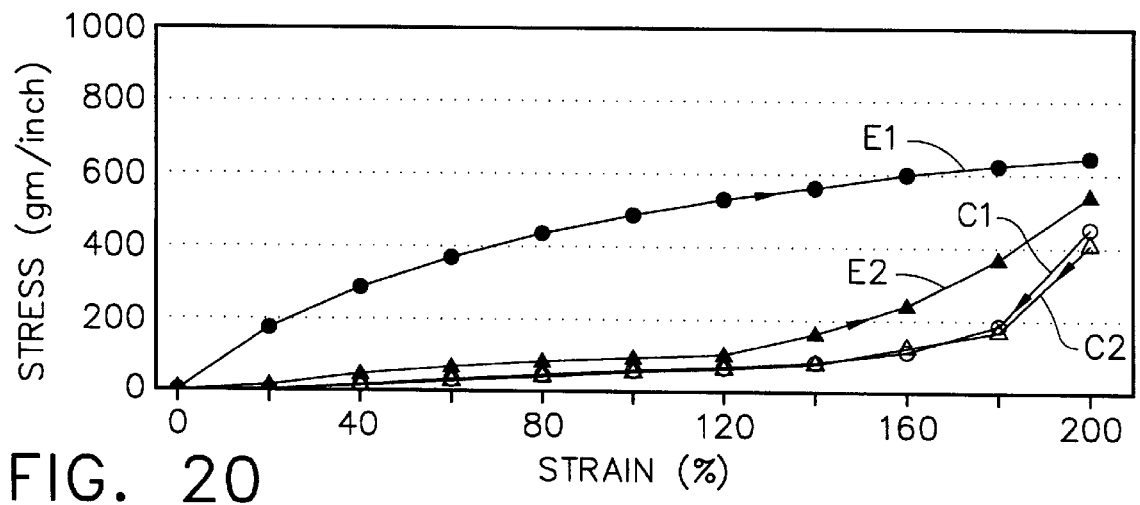
Figure 17:
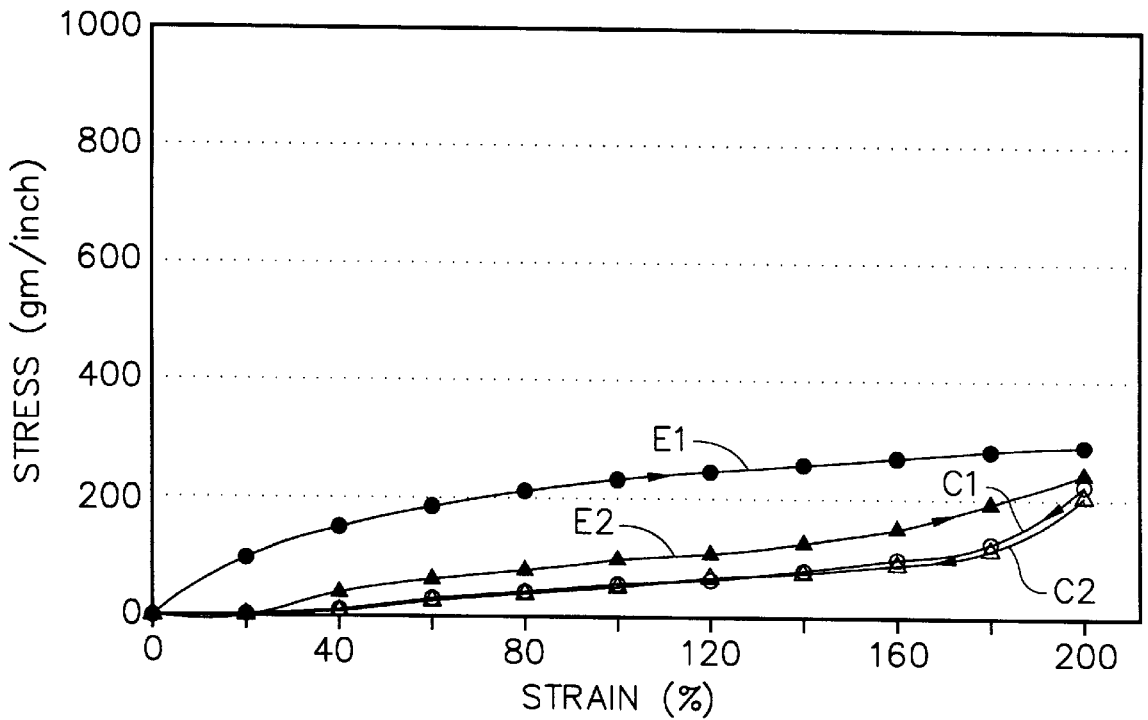
Figure 18:
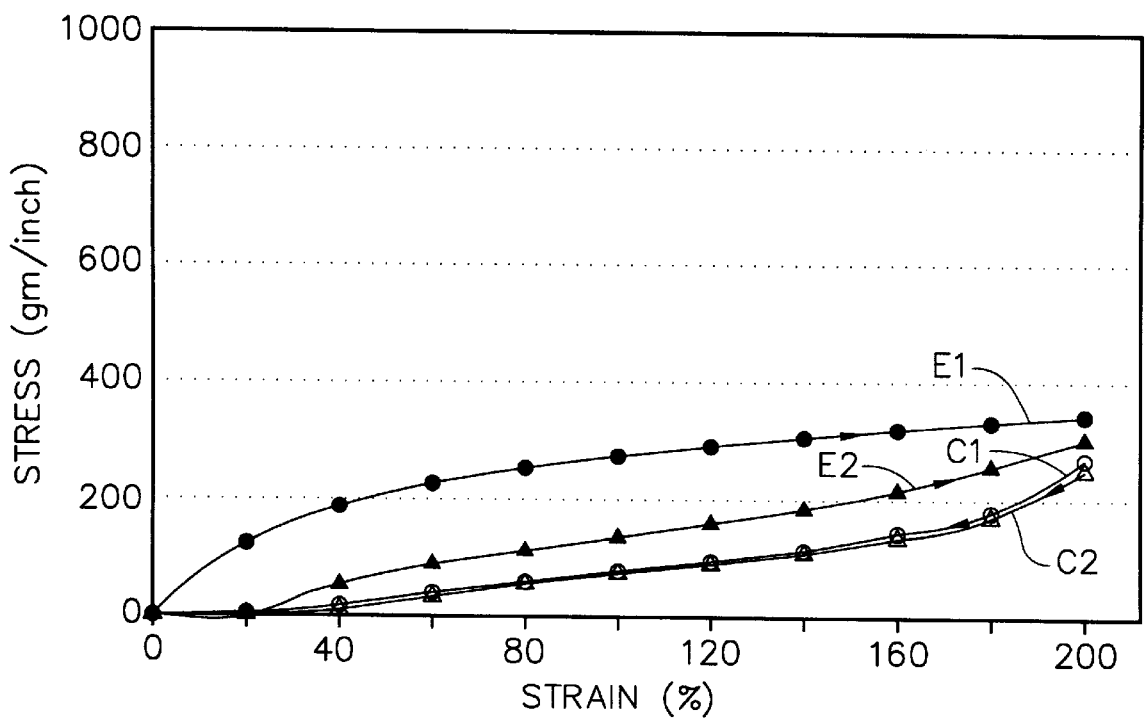

FIG. 16 shows the stress versus strain for one-cycle loading of a trilaminate (Sample 13) made using the same materials used to make Sample 11, except that Exx 560 film (1.8 mils thick, clear) was used instead of proprietary styrenic block copolymer stretch film. A force of about 240 gm/inch was needed to stretch Sample 13 200%.

Other properties of Samples 7–13 are listed in Table 2:

TABLE 2

| Properties | Sample No. | | | | | | |
|---|---|---|---|---|---|---|---|
| | 7 | 8 | 9 | 10 | 11 | 12 | 13 |
| Weight, gsy | 80.3 | 70.3 | 53.1 | 74.0 | 62.4 | 77.0 | 70.1 |
| Caliper, mils | 35.0 | 29.9 | 18.7 | 27.4 | 21.1 | 20.4 | 27.1 |
| MD Tensile, gm/in. | 2908.0 | 2807.0 | 1121.0 | 2950.0 | 916.4 | 905.8 | 884.1 |
| MD Elongation @ break, % | 87.0 | 74.9 | 64.4 | 72.8 | 57.7 | 52.8 | 68.5 |
| CD Tensile, gm/in. | 581.0 | 422.9 | 208.6 | 500.3 | 351.0 | 500.0 | 265.3 |
| CD Elongation @ break, % | 277.1 | 233.6 | 179.5 | 192.7 | 518.8 | 513.9 | 299.3 |
| Frazier Air Perm., cfm | 28.5 | 10.4 | 27.2 | 8.1 | 10.8 | 12.9 | 13.1 |

FIGS. 17–20 are graphs of stress versus strain in the cross direction for two-cycle loading (●, first-cycle expansion; ○, first-cycle contraction; ▲, second-cycle expansion; ∆, second-cycle contraction) of Samples 14–17, respectively. Samples 14 and 15 have a fiber composition of 50% T-104 and 50% T-413 fibers and a 2.4-mil-thick Exx 560 film (55 gsy). The fiber weight was varied in the two samples: 57 gsy for Sample 14 and 32 gsy for Sample 15. Samples 16 and 17 have a fiber composition of 100% T-104 fibers and a 2.4-mil-thick White Exx 560 film (49 gsy). The fiber weight was varied in the two samples: 20 gsy for Sample 16 and 50 gsy for Sample 17. As is apparent from FIGS. 17–20, the laminated fabric in accordance with the present invention can be stretched more 100% in the cross direction and then released to recover elastically during each of two cycles of expansion and contraction Other properties of Samples 14–17 are listed in Table 3.

TABLE 3

| Properties | Sample No. | | | |
|---|---|---|---|---|
| | 14 | 15 | 16 | 17 |
| Weight, gsy | 111.2 | 86.2 | 68.5 | 101.4 |
| Caliper, mils | 40.7 | 27.9 | 28.9 | 51.5 |
| MD Tensile, gm/in. | 2031.0 | 1417.0 | 1173.0 | 2865.0 |
| MD Elongation @ break, % | 54.0 | 55.0 | 75.0 | 86.0 |
| CD Tensile, gm/in. | 689.0 | 571.0 | 317.4 | 646.0 |
| CD Elongation @ break, % | 382.0 | 400.0 | 162.0 | 189.0 |
| Frazier Air Permeability, cfm | 14.0 | 15.0 | — | — |

The foregoing process and apparatus have been disclosed for the purpose of illustration. Variations and modifications will be readily apparent to practitioners skilled in thermal bonding and manufacture of elastomeric laminates. All such variations and modifications are intended to be encompassed by the claims set forth hereinafter.

We claim:

1. A laminated fabric comprising:

a film of elastomeric material having a first melting temperature, said film having a multiplicity of spaced apertures; and first and second carded nonwoven webs sandwiching said film, each of said first and second carded nonwoven webs comprising substantially 100% of staple fibers made of a particular thermoplastic material having a second melting temperature higher than said first melting temperature, wherein thermoplastic fibers which overlap said apertures in said film are fused to each other across said apertures to form densified web portions, leaving undensified web portions consisting of unfused fibers in regions not overlapping said film apertures.

2. The laminated fabric as defined in claim 1, wherein said particular thermoplastic material is polypropylene.

3. The laminated fabric as defined in claim 1, wherein said staple fibers have a break elongation in excess of 400%.

4. The laminated fabric as defined in claim 1, wherein said elastomeric material is a styrene block copolymer blend.

5. The laminated fabric as defined in claim 1, wherein said film has a gauge in a range of 0.5–5.0 mils.

* * * * *